Aug. 11, 1970    L. SIEGEL    3,524,045
ELECTRICALLY HEATED TOOL WITH TIP EJECTING MEANS
Filed Feb. 7, 1969

INVENTOR.
LOUIS SIEGEL
BY
Wolf, Greenfield Hicken & Sacks
ATTORNEYS

United States Patent Office 3,524,045
Patented Aug. 11, 1970

3,524,045
ELECTRICALLY HEATED TOOL WITH
TIP EJECTING MEANS
Louis Siegel, 43 Gardner Road,
Brookline, Mass. 02146
Filed Feb. 7, 1969, Ser. No. 797,579
Int. Cl. B23k 3/02; H05b 3/00
U.S. Cl. 219—229                                6 Claims

ABSTRACT OF THE DISCLOSURE

An electrically heated tool includes replaceable tips characterized by a tip-ejection feature that facilitates ejection of a hot tip without burning the user while leaving the heating element and handle assembly in a condition for easily receiving a new tip and securing it firmly in place for heating. The tip ejector comprises a telescopically mounted member the tool handle assembly. The member is manually slidable into tip dislodging engagement with a tip slidably received on the end of a heating element carried at the forward end of the handle assembly.

BACKGROUND OF THE INVENTION

The present invention relates in general to an electrically heated tool with replaceable tips and more particularly concerns a device especially useful in dentistry where heating wax strips to conform to specified contours frequently requires a change in the shape of the heated tips during the shaping process. The present invention facilitates rapid ejection of a hot tip without burning the user while readying the handle and heating element assembly in condition for rapidly receiving a new tip.

It is an important object of this invention to provide electrically heated tips that facilitate rapid and easy tip interchangeability without burning the user.

It is another object of the invention to achieve the preceding object with apparatus that operates reliably and is relatively inexpensive and easy to fabricate.

It is a further object of the invention to achieve one or more of the preceding objects with apparatus that is mechanically rugged and operates reliably.

SUMMARY OF THE INVENTION

According to the invention, there are handle means for providing a hand-gripping surface, electrical heating means and means including rear housing means and front housing means that are normally together for holding tip element means in fixed relationship with respect to the housings and the tip element means in thermal contact with the heating means. Urging the rear housing means and front housing means apart releases the tip element means while leaving the heating means in a position for receiving a new tip element.

Numerous other features, objects and advantages of the invention will become apparent from the following specification when read in connection with the accompanying drawing,

DETAILED DESCRIPTION OF PREFERRED EMBODIMENTS

Figure 1:
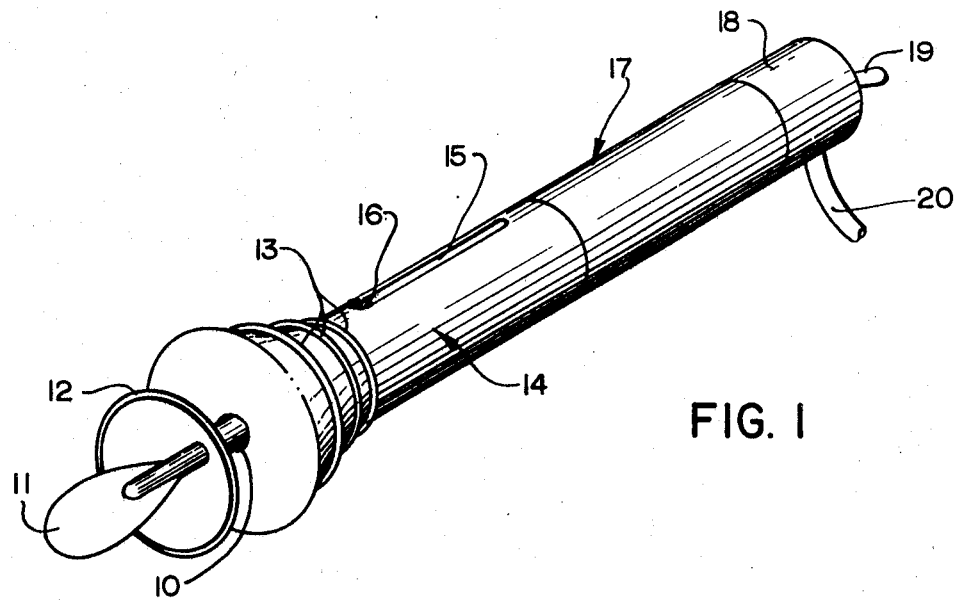
FIG. 1 is a perspective view of an electric heating tool according to the invention.
Figure 2:
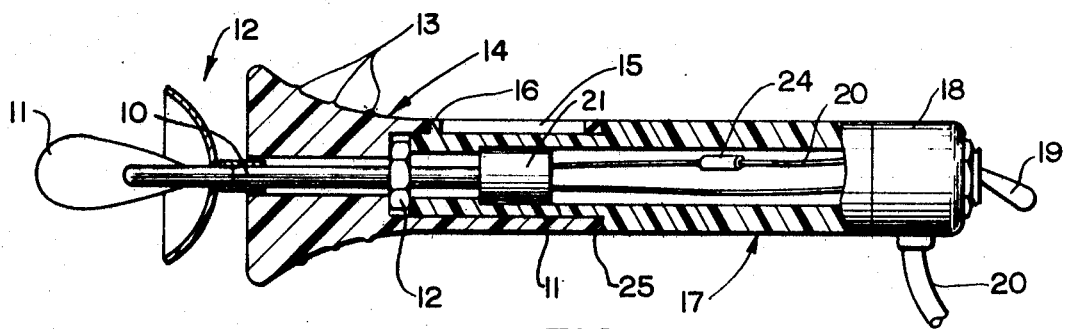
FIG. 2 is a view largely in axial section of the tool helpful in understanding the relationship among the different elements.

The electric heating tool comprises a replaceable tip 11 which is surrounded by a drip and heat reflector shield 12. Tip 11 is formed with a cup-shaped end that fits over the end of heating element 10 in good thermal and mechanical contact. Circumferential ridges 13 are formed in front housing 14 to facilitate gripping the tool. An L-shaped slot opening 15 embraces a slot limiting pin 16 that functions to limit relative axial displacement between front housing 14 and rear housing 17 when the two are urged apart to release replaceable tip 11. When the two are together, they may be rotated relatively so that pin 16 resides in the circumferential portion of slot 15 to keep them together.

An end cap 18 covers the opening of rear housing 17 and carries a high-low-off switch 19 for selecting off, high or low heat. A line cord 20 carries electricity, typically from an ordinary A-C outlet, or from a transformer, if it is desired that the heating element be operated by a low voltage source, to heating element socket 21 through current limiting resistor 24. Socket 21 carries heating element 10.

Figure 3:
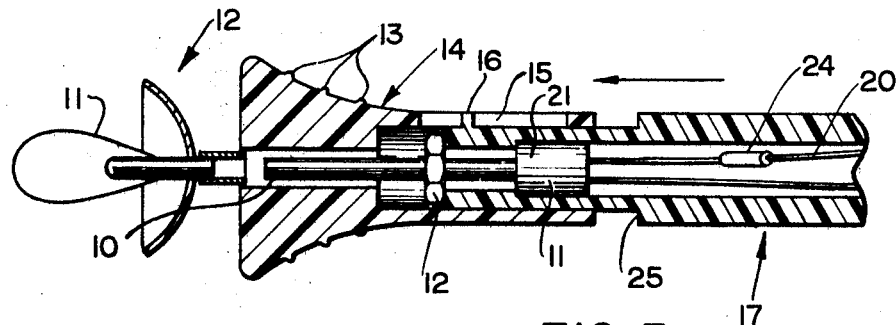
FIG. 3 shows the front and rear housing separated.

Having described the physical arrangement of the invention, its mode of operation will be discussed. To remove replaceable tip 11, grip rear housing 17 and front housing 14, rotate them relatively until pin 16 is in the longitudinal portion of slot 15, and move the two apart. The force against drip and heat reflector shield 12 then urges replaceable tip 11 off the end, as seen in FIG. 3, of heating element 10. The maximum relative displacement is limited by limiting slot pin 16. Then move the two housing portions together so that front housing 14 comes to rest with its end upon shoulder 25 of rear housing 17 and rotate the two housings so that pin 16 is in the circumferential portion of slot 15, thereby leaving heating element 10 exposed to receive a new tip element 11.

There has been described a novel electrical heating tool assembly characterized by ease of use, ease of safe ejection of a hot tip, ease of inserting a new tip, mechanical and electrical ruggedness and constructed so as to facilitate manufacture on a large scale basis. It may be used for heating wax, soldering or other uses where a heated tip is required.

It is evident that those skilled in the art may now make numerous uses and modifications of an departures from the specific embodiment described herein without departing from the inventive concepts. Consequently, the invention is to be construed as embracing each and every novel feature and novel combination of features present in or possessed by the apparatus and techniques herein disclosed.

What is claimed is:

1. Electrical heating apparatus comprising,
   front housing means journaled on the front end of an elongated rear housing means defining a handle structure said front housing means being arranged for limited axial movement relative to the longitudinal axis of the rear housing means,
   elongated electric heating element means having a rear portion inside the rear housing means and having its front end extending through said front housing means,
   said front housing means being axially displaceable relative to the longitudinal axis of the heating element,
   means for supporting said heating element means in fixed relationship to said rear housing means,
   means for delivering electrical energy to said heating element means,
   a detachable tip means slidably received on the front end of said heating element means,
   and ejecting means on the forward end of said front housing means for ejecting said tip means carried on the front of said heating element means when said front housing means and said rear housing means are urged apart, said tip means having means for receiving ejecting forces from said ejecting means when the front housing means is urged axially forwardly of the rear housing means.

2. Electrically heated apparatus in accordance with claim 1 and further comprising, said tip means formed with a recess for snug mechanical and thermal engagement with said front portion of said electrical heating means removably secured thereto.

3. Electrical heating apparatus in accordance with claim 1 and further comprising heat shield means in fixed relationship with respect to said tip means for both shielding heat from said front housing and forming said means for receiving ejecting forces when said front housing means and said rear housing means are urged apart to eject said tip.

4. Electrical heating apparatus in accordance with claim 2 and further comprising heat shield means in fixed relationship with respect to said tip means for both shielding heat from said front housing and forming said means for receiving ejecting forces when said front housing means and said rear housing means are urged apart to eject said tip.

5. Electrical heating apparatus in accordance with claim 1 wherein said front housing means is formed with a slot having a longitudinal portion generally parallel to the longitudinal axis of said apparatus and said rear housing means carries limiting pin means arranged to ride in said slot for limiting the maximum axial displacement of said front and rear housing means.

6. Electrical heating apparatus in accordance with claim 5 wherein said slot includes a circumferential portion for receiving said limiting pin means when said front housing means and said rear housing means are together.

References Cited

UNITED STATES PATENTS

| | | | |
|---|---|---|---|
| 2,952,763 | 9/1960 | Gustafsson | 219—229 |
| 3,120,598 | 2/1964 | Westerback et al. | 219—229 |
| 3,138,984 | 6/1964 | Penner | 81—177 X |
| 3,393,857 | 7/1968 | Taylor, et al. | 228—55 |

FOREIGN PATENTS 364,668  11/1922  Germany.

ANTHONY BARTIS, Primary Examiner

U.S. Cl. X.R.

30—140; 32—70; 219—238; 228—55